United States Patent
Ahn et al.

(10) Patent No.: US 10,326,930 B2
(45) Date of Patent: Jun. 18, 2019

(54) METHOD AND SYSTEM FOR RECOMMENDING OPTIMUM POSITION OF PHOTOGRAPHY

(71) Applicant: LINE Corporation, Shibuya-ku, Tokyo (JP)

(72) Inventors: Dookyung Ahn, Seongnam-si (KR); Sangcheol Jeon, Seongnam-si (KR); Young-hun Kim, Seongnam-si (KR)

(73) Assignee: SNOW CORPORATION, Gyeonggi-do (KR)

( * ) Notice: Subject to any disclaimer, the term of this patent is extended or adjusted under 35 U.S.C. 154(b) by 17 days.

(21) Appl. No.: 15/407,666

(22) Filed: Jan. 17, 2017

(65) Prior Publication Data

US 2017/0208244 A1   Jul. 20, 2017

(30) Foreign Application Priority Data

Jan. 19, 2016   (KR) .................. 10-2016-0006246

(51) Int. Cl.
*H04N 5/232* (2006.01)
*H04N 5/247* (2006.01)
(Continued)

(52) U.S. Cl.
CPC ....... *H04N 5/23222* (2013.01); *G06K 9/6202* (2013.01); *H04N 5/23216* (2013.01);
(Continued)

(58) Field of Classification Search
CPC ........... H04N 5/23222; H04N 5/23216; H04N 5/23293; H04N 5/247; H04N 5/2621;
(Continued)

(56) References Cited

U.S. PATENT DOCUMENTS

2013/0260893 A1   10/2013   Shin et al.
2013/0332543 A1   12/2013   Shin et al.
(Continued)

FOREIGN PATENT DOCUMENTS

KR   2015/0134960 A   12/2015
WO   WO-2015/065001 A1   5/2015

*Primary Examiner* — Twyler L Haskins
*Assistant Examiner* — Fayez Bhuiyan
(74) *Attorney, Agent, or Firm* — Harness, Dickey & Pierce, P.L.C.

(57) ABSTRACT

Provided is a method and system for recommending an optimal position of photographing. A optimal position-of-photographing recommendation method may include executing, at an electronic device, and controlling a camera included in the electronic device under control of a photography application executed on the electronic device; calculating, at the electronic device, a photograph angle of the electronic device based on sensor information provided from a sensor of the electronic device under control of the photography application; comparing, at the electronic device, the calculated photograph angle to a desired angle range that is managed by the photography application, under control of the photography application; and outputting, at the electronic device, notification data in response to the calculated photograph angle being included in the desired angle range, under control of the photography application.

18 Claims, 10 Drawing Sheets

(51) Int. Cl.
*H04N 5/262* (2006.01)
*G06K 9/62* (2006.01)
*G08B 3/10* (2006.01)
*G08B 6/00* (2006.01)

(52) U.S. Cl.
CPC ......... *H04N 5/23293* (2013.01); *H04N 5/247* (2013.01); *H04N 5/2621* (2013.01); *H04N 5/2628* (2013.01); *G08B 3/10* (2013.01); *G08B 6/00* (2013.01)

(58) Field of Classification Search
CPC ...... H04N 5/2628; G06K 9/6202; G08B 3/10; G08B 6/00
See application file for complete search history.

(56) References Cited

U.S. PATENT DOCUMENTS

2014/0019540 A1    1/2014   Shin et al.
2015/0215526 A1*   7/2015   Jafarzadeh .............. G06F 3/012
                                                           348/218.1

* cited by examiner

METHOD AND SYSTEM FOR RECOMMENDING OPTIMUM POSITION OF PHOTOGRAPHY

CROSS-REFERENCE TO RELATED APPLICATION(S)

This U.S. non-provisional application claims the benefit of priority under 35 U.S.C. § 119 to Korean Patent Application No. 10-2016-0006246 filed on Jan. 19, 2016, in the Korean Intellectual Property Office (KIPO), the entire contents of which are incorporated herein by reference.

BACKGROUND

Field

One or more example embodiments relate to methods, apparatuses, systems, and/or non-transitory computer readable media for recommending a desired, preferred, and/or optimal position for photography.

Description of Related Art

In the related art, when taking a photo using a photograph application for controlling a camera included in an electronic device, such as a smartphone, a user generally prefers a specific angle and/or distance. For example, when taking a selfie, the user may desire to take a selfie at a preferred angle, such as, an angle of the electronic device, and/or a preferred distance, such as, a distance between the user and the electronic device. Here, in the related art, the user needs to obtain the desired angle and distance while viewing a screen of the electronic device and manually shifting the position of the electronic device simultaneously every time the user takes a photo, such as a selfie.

Also, the user may desire to take a photo of a specific object at a preferred angle and/or distance. For example, in the case of taking a photo of food, the user may generally desire to take the photo by adjusting the angle of the electronic device to be horizontal (e.g., parallel) relative to the ground. In this case, the user may not be able to readily verify a screen of the electronic device while viewing the object through the viewfinder and/or screen of the electronic device and may not be able to verify whether the angle of the electronic device is horizontal relative to the ground.

As the related art of recommending a photograph composition, there is technology for guiding a recommendation position of a user. However, the related art, only recommends appropriate photography composition settings and does not inform the user that the camera and/or the electronic device is appropriately positioned at a preferred photography position of the user.

SUMMARY

One or more example embodiments provide an optimal position-of-photographing recommendation method, apparatus, system, and/or non-transitory computer readable medium that may store (or pre-store) and manage a range of a desired and/or preferred angle of an electronic device of a user and/or a range of a desired and/or preferred distance of the user between the electronic device and an object, may calculate an angle and a distance of the electronic device when taking a photo or video, and if the calculated angle and distance are included in the stored angle range and/or distance range, and may provide a notification to the user, thereby decreasing or eliminating inconveniences that the user faces regarding changing the angle and a position of the electronic device while the user takes a photo and/or video.

One or more example embodiments also provide an optimal position-of-photographing recommendation method, apparatus, system, and/or non-transitory computer readable medium that may provide a function capable of changing and controlling a size to which a filtering effect is to be applied on a captured image based on a calculated angle and/or distance, so that a user may further conveniently select a filtering area.

According to an aspect of at least one example embodiment, there is provided a non-transitory computer-readable medium storing a computer readable instructions, which when executed by at least one processor, causes the at least one processor to implement an optimal position-of-photographing recommendation method, wherein the optimal position-of-photographing recommendation method. The optimal position-of-photographing recommendation method includes controlling a camera included in an electronic device based on a photography application executed on the electronic device, calculating a photograph angle of the electronic device based on sensor information provided from at least one sensor of the electronic device, comparing the calculated photograph angle to a desired angle range, and outputting notification data in response to the calculated photograph angle being within the desired angle range.

According to another aspect of at least one example embodiment, there is provided an optimal position-of-photographing recommendation method performed by an electronic device. The method includes executing, using at least one processor, and controlling a camera included in the electronic device, calculating, using the at least one processor, a photograph angle of the electronic device based on sensor information provided from at least one sensor of the electronic device, comparing, using the at least one processor, the calculated photograph angle to a desired angle range, and outputting, using the at least one processor, notification data in response to the calculated photograph angle being within the desired angle range.

According to an aspect of at least one example embodiment, there is provided an optimal position-of-photographing recommending system of an electronic device, the system including a memory having computer readable instructions stored thereon and at least one processor configured to execute the computer-readable instructions to control a camera included in the electronic device, calculate a photograph angle of the electronic device based on sensor information provided from at least one sensor of the electronic device, compare the calculated photograph angle to a desired angle range, and output notification data in response to the calculated photograph angle being within the desired angle range.

According to an aspect of at least one example embodiment, there is provided an apparatus for executing a photography application, the apparatus including at least one sensor configured to sense angle information and distance information, at least one camera, a display panel, and at least one processor configured to receive inputs associated with a desired angle and a desired distance for an image to be captured, receive current angle information, receive current distance information of the at least one camera relative to a target of the at least one camera from the at least one sensor, determine whether the at least one camera is in a desired position based on the current angle information, the current distance information, the desired angle, and the desired distance, and output a notification based on results of the determination to the display panel.

Further areas of applicability will become apparent from the description provided herein. The description and specific examples in this summary are intended for purposes of illustration only and are not intended to limit the scope of the present disclosure.

BRIEF DESCRIPTION OF THE FIGURES embodiments will be described in more detail with regard to the figures, wherein like reference numerals refer to like parts throughout the various figures unless otherwise specified, and wherein.

Figure 1:
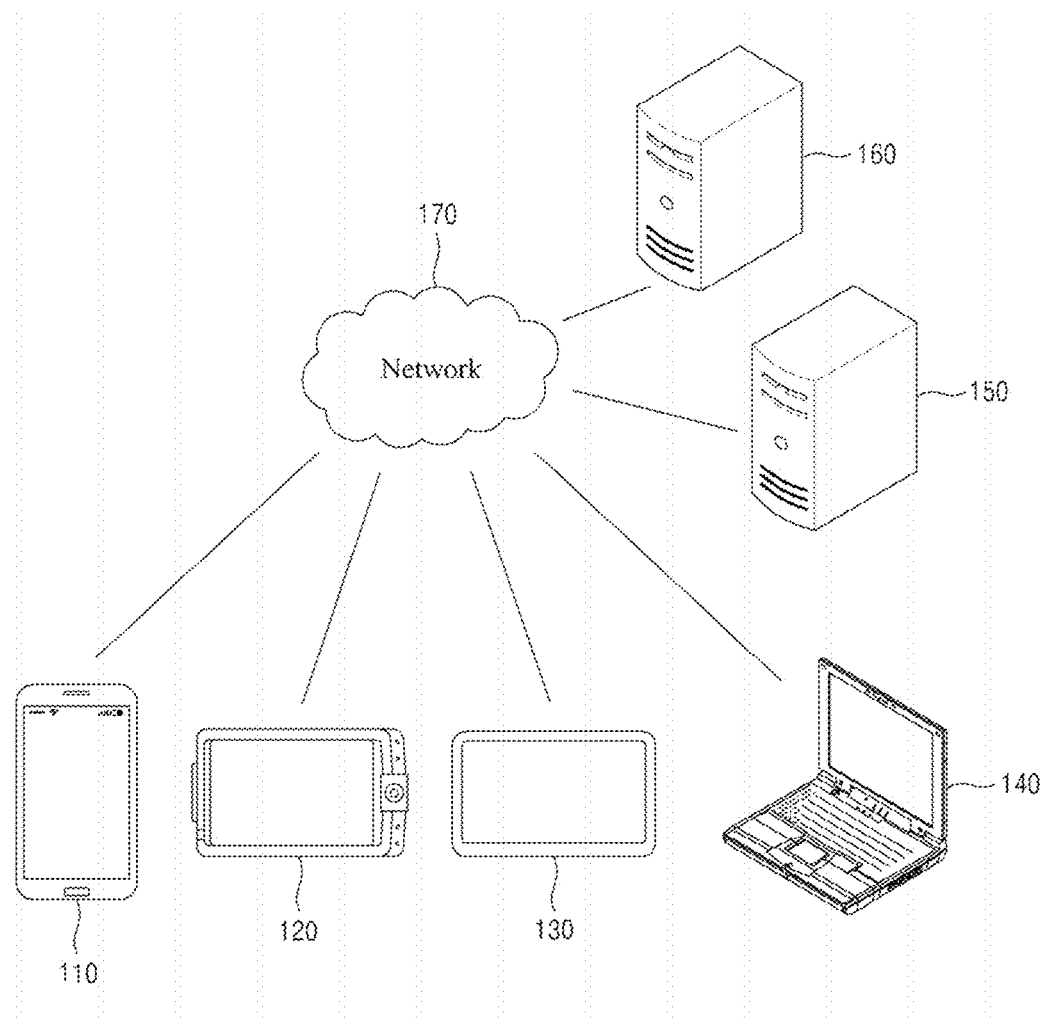
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the example embodiments are not limited thereto and, for example, the number of electronic devices and/or the number of servers are not limited thereto and the network environment may contain more or less constituent elements.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a personal computer, a laptop computer, a digital broadcasting terminal, a personal digital assistant (PDA), a portable multimedia player (PMP), a tablet, a game console, a wearable device, an Augmented Reality (AR) and/or Virtual Reality (VR) device, an Internet of Things (IoT) device, and the like. For example, the electronic device 110 may communicate with other electronic devices 120, 130, and/or 140, and/or the servers 150 and/or 160 over the network 170 in a wired communication manner and/or in a wireless communication manner.

The communication scheme is not particularly limited and may include a communication method that uses near field communication (NFC) between devices as well as a communication method using a communication network, for example, a mobile communication network, the wired Internet, the wireless Internet, a broadcasting network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. Also, the server 160 may connect to the server 150 under control of at least one program, for example, a browser or the installed application, an operating system (OS) included in the electronic device 110, etc., and may use a service or content provided from the server 150. For example, in response to a service request message transmitted from the electronic device 110 to the server 150 over the network 170 under control of the application, the server 150 may transmit a message and/or code corresponding to the service request message to the electronic device 110, and the electronic device 110 may provide content to the user by configuring and displaying a screen corresponding to the message and/or code under the control of the application. As another example, the server 150 may set a communication session for a messaging service and may route a message transmission and reception between the plurality of electronic devices 110, 120, 130, and/or 140 through the set communication session.

Figure 2:
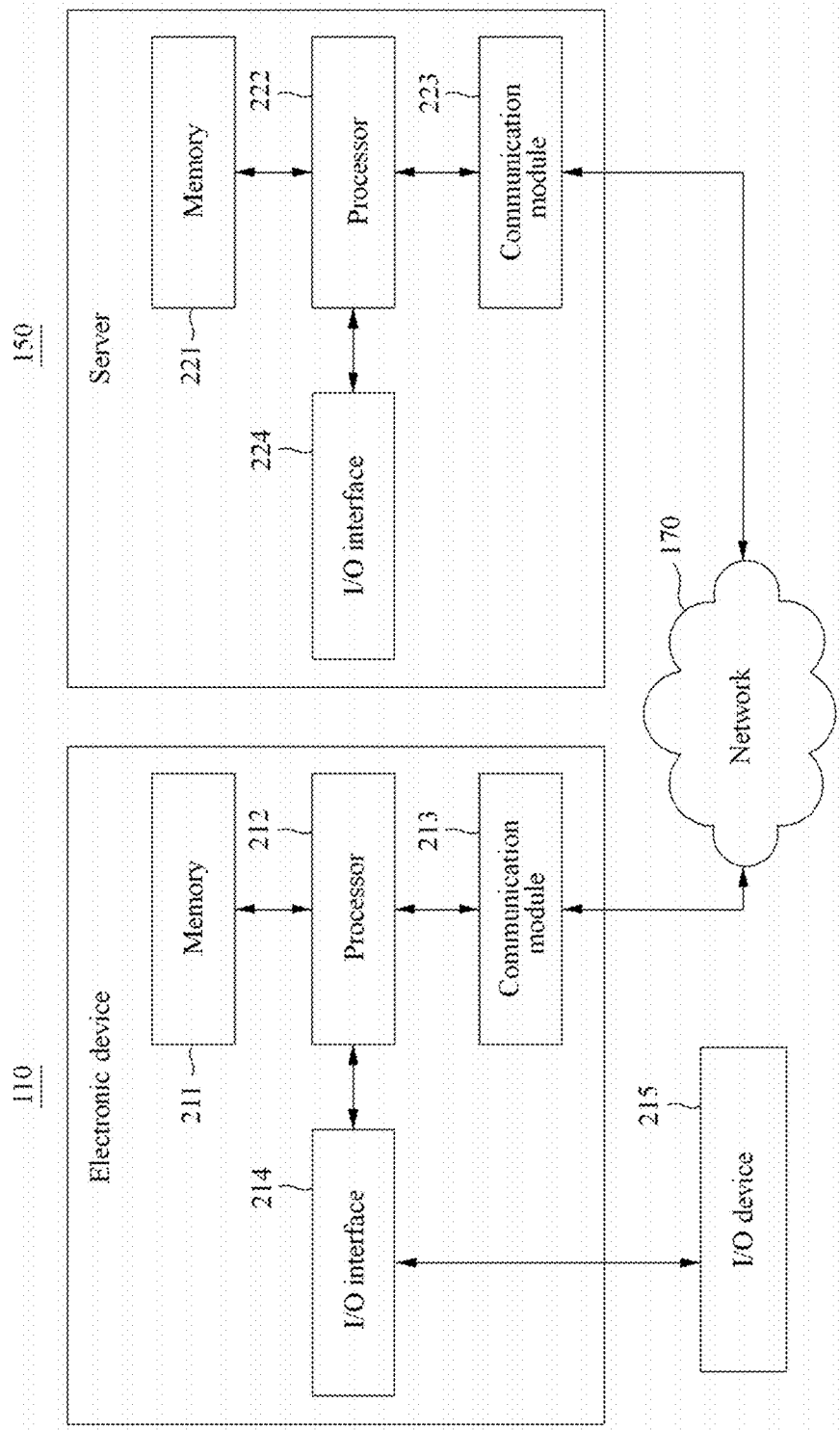
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server, but the example embodiments are not limited thereto. The same or similar constituent elements may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, etc., and the server 150 may include a memory 221, at least one processor 222, a communication module 223, and an I/O interface 224, etc. The memory 211, 221 may include a permanent mass storage device, such as random access memory (RAM), read only memory (ROM), a disk drive, etc., as a non-transitory computer-readable storage medium. Also, an OS and at least one program code, for example, a code for an application for video call, a browser, etc., installed and executed on the electronic device 110, may be stored in the memory 211, 221. Such software constituent elements may be loaded from another non-transitory computer-readable storage medium separate from the memory 211, 221 using a drive mechanism. The other computer-readable storage medium may include, for example, a floppy drive, a disk, a tape, a Bluray/DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received instructions in response to the program code stored in the storage device, such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request, for example, a request for a video call service, created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, etc., of the server 150 received through the communication module 213 may be transferred to the processor 212 or the memory 211, and content, a file, etc., may be stored in a storage medium further includable in the electronic device 110.

The I/O interface 214, 224 may be a device used for interface with an I/O device 215. For example, an input device may include a keyboard, a mouse, a touch panel, a microphone, a camera, etc., and an output device may include a display device, such as a touch display for displaying a communication session of an application, a speaker, a haptic feedback device, etc. As another example, the I/O interface 214 may be a device for interface with an apparatus in which an input function and an output function are integrated into a single function, such as a touch screen. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of constituent elements than the number of constituent elements shown in FIG. 2. For example, the electronic device 110 may include at least a portion of the I/O device 215, or may further include other constituent elements, for example, a transceiver, a global positioning system (GPS) module, a camera, a variety of sensors, a database, and the like. In detail, if the electronic device 110 is a smartphone, the electronic device 110 may be configured to further include a variety of constituent elements, for example, an accelerometer sensor, a gyro sensor, a camera, various physical buttons, a button using a touch panel, an I/O port, a vibration motor for vibration, etc., which are generally included in the smartphone.

Herein, the electronic device 110 may be a device in which a photography application (and/or camera application) is installed. An optimal (e.g., desired, user preferred, etc.) position-of-photographing recommendation system may be configured on the electronic device 110 through a control command provided from the photography application. The photography application (e.g., a camera application, a photo-taking application, a 360 degree photo-taking application, a three-dimensional (3D) photo-taking application, a video-taking application, a 360-degree video-taking application, a 3D video-taking application, etc.) may be a program that is installed on the electronic device 110 to independently control the electronic device 110, and may also be a program that controls the electronic device 110 by additionally using an instruction from the server 150 through communication with the server 150. For example, the photography application may be a stand-alone application, a chat application, an instant messaging application, an e-mail application, a gaming application, and/or a social network service (SNS) application. In this case, the electronic device 110 may transmit and receive a message for conversation to and from another electronic device, for example, the electronic device 120 through the server, or may upload content on a website. Here, the chat application, and/or the SNS application, etc., may include a function of acquiring an image captured by controlling the camera, and the electronic device 110 may perform the optimal position-of-photographing recommendation method through the function.

Figure 3:
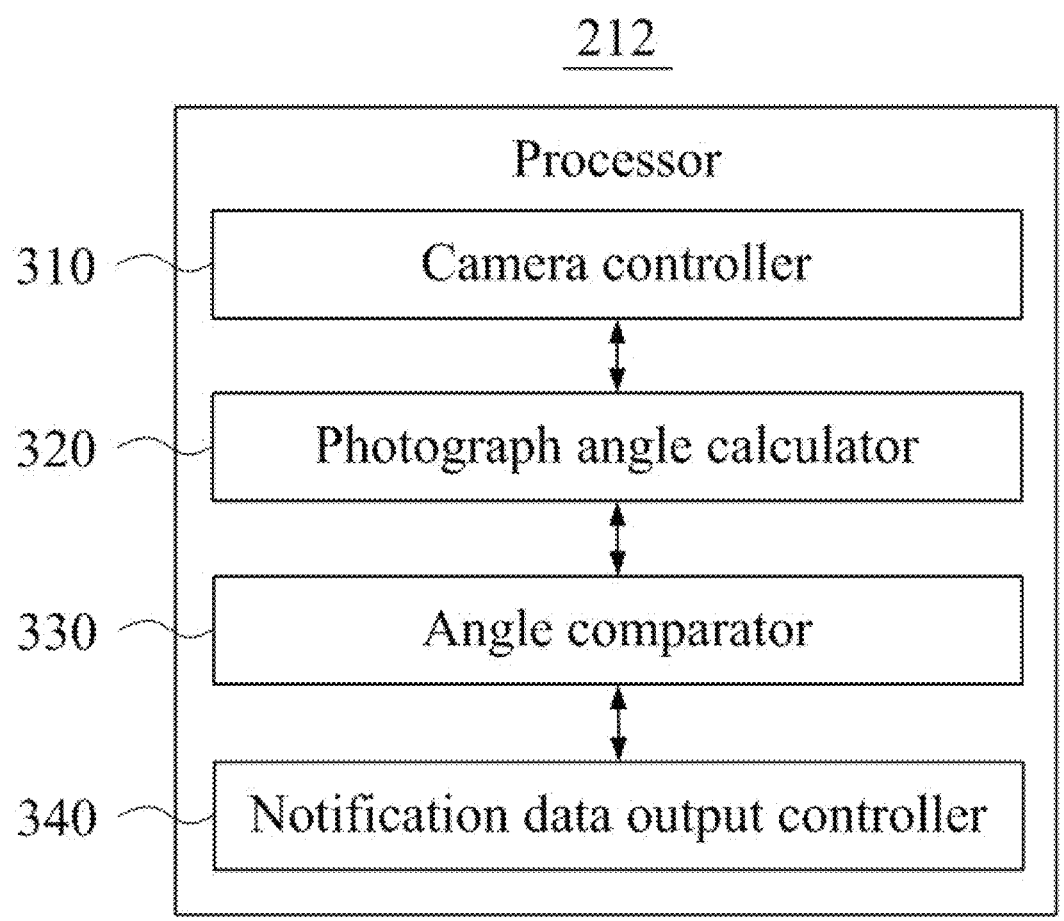
FIG. 3 is a diagram illustrating an example of constituent elements of at least one processor of a server according to at least one example embodiment.
Figure 4:
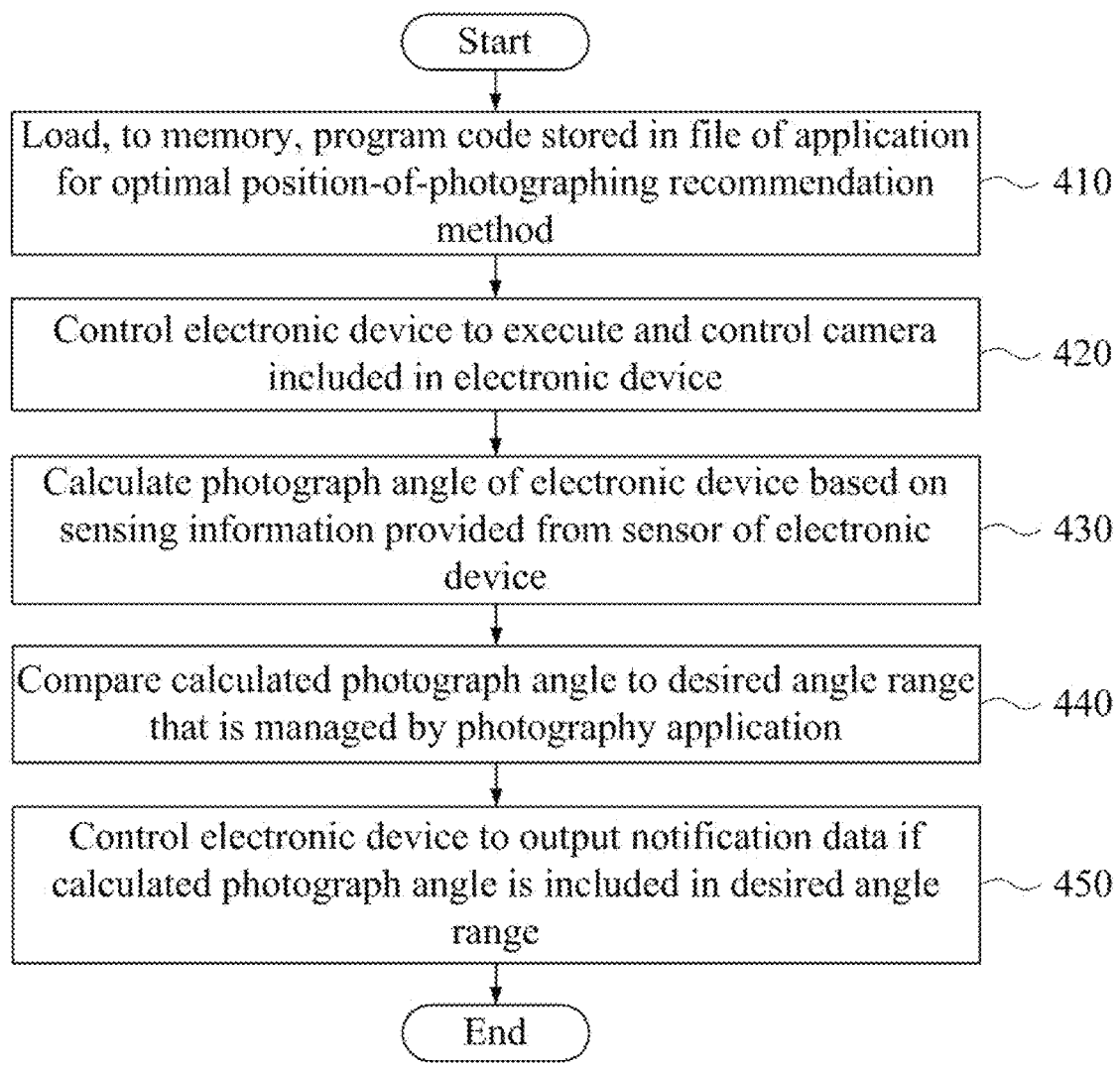
FIG. 4 is a flowchart illustrating an example of an optimal position-of-photographing recommendation method performed by an electronic device according to at least one example embodiment.

FIG. 3 is a diagram illustrating an example of constituent elements of at least one processor of a server according to at least one example embodiment, and FIG. 4 is a flowchart illustrating an example of an optimal position-of-photographing recommendation method performed by an electronic device according to at least one example embodiment.

Referring to FIG. 3, the at least one processor 212 of the electronic device 110 may include a camera controller 310, a photograph angle calculator 320, an angle comparator 330, and a notification data output controller 340, etc. The processor 212 and the constituent elements of the processor 212 may control the electronic device 110 to perform operations 410 through 450 included in the optimal position-of-photographing recommendation method of FIG. 4. Here, the processor 212 and the constituent elements of the processor 212 may be configured to execute instructions according to a code of at least one program and a code of an OS included in the memory 211. Here, the at least one program may correspond to the aforementioned photography application. Also, the constituent elements of the processor 212 may be representations of different functions performed at the processor 212 in response to a control command provided from the photography application. For example, the processor 212 may use the camera controller 310 as a functional representation that operates to execute and control the camera in response to the control command.

In operation 410, the processor 212 may load, to the memory 211, a program code stored in a file of an application for the optimal position-of-photographing recommendation method. For example, the application may be the photography application, and may include a control command for controlling the electronic device 110 to perform the optimal position-of-photographing recommendation method.

Here, the processor 212 and the camera controller 310, the photograph angle calculator 320, the angle comparator 330, and/or the notification data output controller 340, etc., included in the processor 212 may be different functional representations of the processor 212 to perform operations 420 through 450 by executing a command of a portion corresponding to the program code loaded to the memory 211. The processor 212 and the constituent elements of the processor 212 may control the electronic device 110 to perform operations 420 through 450. For example, the processor 212 may control the electronic device 110 to proceed with photographing (e.g., image capturing, video capturing, etc.) by executing the camera included in the electronic device 110.

In operation 420, the camera controller 310 may control the electronic device 110 to execute and control the camera included in the electronic device 110. Once the camera and/or camera application is executed (e.g., the camera and/or camera application is turned on, opened, etc.), the camera controller 310 and/or the processor 212 may control the electronic device 110 to provide a user interface capable of receiving a command from the user to display an image output from the camera on a display of the electronic device 110 and/or to take an image of a specific moment.

In operation 430, the photograph angle calculator 320 may calculate a photograph angle (e.g., a photograph/video capture angle) of the electronic device 110 based on sensing information provided from a sensor of the electronic device 110. The photograph angle calculator 320 may determine, continuously and/or in real-time, the angle of a photograph (and/or video) captured and/or to be captured (or will be captured) based on the current angle of the electronic device 110. In other words, the photograph angle calculator 320 determines the angle of the electronic device 110 (and/or the camera lens and/or camera of the electronic device 110) as the user is preparing to take a photograph and/or video. The photograph angle may be represented based on angles associated with three axes, for example, x axis, y axis, and z axis of three-dimensional (3D) space. For example, an OS of the electronic device 110 may provide sensing information from an accelerometer sensor, a gyroscope sensor, etc., included in the electronic device 110. The photograph angle calculator 320 may process the sensing information provided from the OS and may calculate an angle of the electronic device 110 (e.g., the angle at which the electronic device 110 is being held by a user, etc.). As another example, the OS may process the sensing information and may provide angle information of the electronic device 110 on the 3D space that may be used as a reference. In this case, the photograph angle calculator 320 may calculate a photograph capturing angle suitable for the optimal position-of-photographing recommendation method based on the provided angle. In detail, the optimal position-of-photographing recommendation method may use angle information provided from the OS for the photograph angle as is, and may also calculate the photograph angle by analyzing the image output from the camera and using the angle of the electronic device 110 relative to an object and angle information provided from the OS. Here, the angle of the electronic device 110 relative to the object may be calculated using a known image analysis method.

In operation 440, the angle comparator 330 may compare the calculated photograph angle to a desired and/or preset angle range that is managed by the photography application. The angle range may be managed as a range of a desired and/or preferred angle of the user. The angle range may be preset based on a value of an angle measured using past photographs captured by the user, or from past photographs captured by groups of users, photography experts, etc. For example, the desired and/or preset angle range may be updated based on the photograph angle of the electronic device 110 that is calculated at a point in time at which previous photographing has been performed using the executed and controlled camera. That is, the angle comparator 330 may compare a current photograph capture angle of the electronic device 110 to the angle range to which a photograph angle desired and/or preferred by users has been applied.

For example, the electronic device 110 may include a front camera provided at the front of the electronic device 110 and a rear camera provided at the rear of the electronic device 110. Here, the angle range may include a first angle range associated with photographing using the front camera and a second angle range for determining whether the electronic device 110 is horizontal and/or parallel (or other desired orientation) relative to the ground, background, the subject of the photograph, etc., in association with capturing photographs and/or videos using the rear camera. For example, the first angle range may be an angle range set in association with taking a selfie, etc., and the second angle range may be an angle range set in association with taking horizontal and/or parallel photos in relation to an object, such as food, etc., but the example embodiments are not limited thereto and the angle range may be set according to any other photography situations, such as taking group photos, portraits, action images, nature images, videos, 3D photos/videos, 360-degree photos/videos, etc.

In operation 450, the notification data output controller 340 may control the electronic device 110 to output notification data if the calculated photograph angle is included in the desired and/or preset angle range. For example, the notification data output controller 340 may notify the user that a current photograph capture angle of the electronic device 110 is a desired and/or preferred angle of the user. The photograph capture angle may be the exact same angle as the desired and/or preferred angle, or may be within an acceptable range close to the desired and/or preferred angle. The notification may be made by outputting a visual signal to the user, such as changing a display color and/or a display shape with respect to at least a portion of a display included in the electronic device 110, flashing a light indicator to the user, etc., outputting an auditory signal through a speaker included in the electronic device 110, and/or by outputting a tactile signal using a haptic feedback device (e.g., a vibration motor, etc.) included in the electronic device 110. Additionally, the notification may provide instructions and/or indications to the user to allow the user to adjust the photograph angle of the electronic device 110 so that it matches the desired and/or preferred angle. For example, the user may be provided with visual, auditory, and/or haptic notifications indicating the amount of difference between the current photograph angle and the desired and/or preferred photograph angle, instructions on how to adjust the electronic device 110 to match the desired and/or preferred photograph angle, etc. Accordingly, the user may further easily retrieve a position of photographing desired, preferred, and/or optimized for the user.

In addition to the photograph angle, a distance between the electronic device 110 and the object, and a desired and/or preset distance range may be further used to recommend the optimal position of photography. For example, a user attempting to film a movie scene using the electronic device 110 may desire to keep the camera at a desired distance (or desired distances) from the actors of the scene and/or keep the camera at a desired photograph angle (or desired photograph angles) to the actors of the scene. Accordingly, the user may input the desired distance and/or desired photograph angle into the user interface of the photograph application, and while setting up the camera for shooting, will be provided with information related to whether the current camera distance and/or angle is at the desired camera distance and/or angle. Additionally, this may provide further benefit during filming of "tracking shots" wherein the actors and/or the camera are moving while the scene is acted and filmed. Also, the aforementioned angle range and distance range may be learned. Additionally, a camera filtering effect may be applicable to different areas based on the calculated angle of the electronic device 110 and/or the calculated distance between the electronic device 110 and the object.

Figure 5:
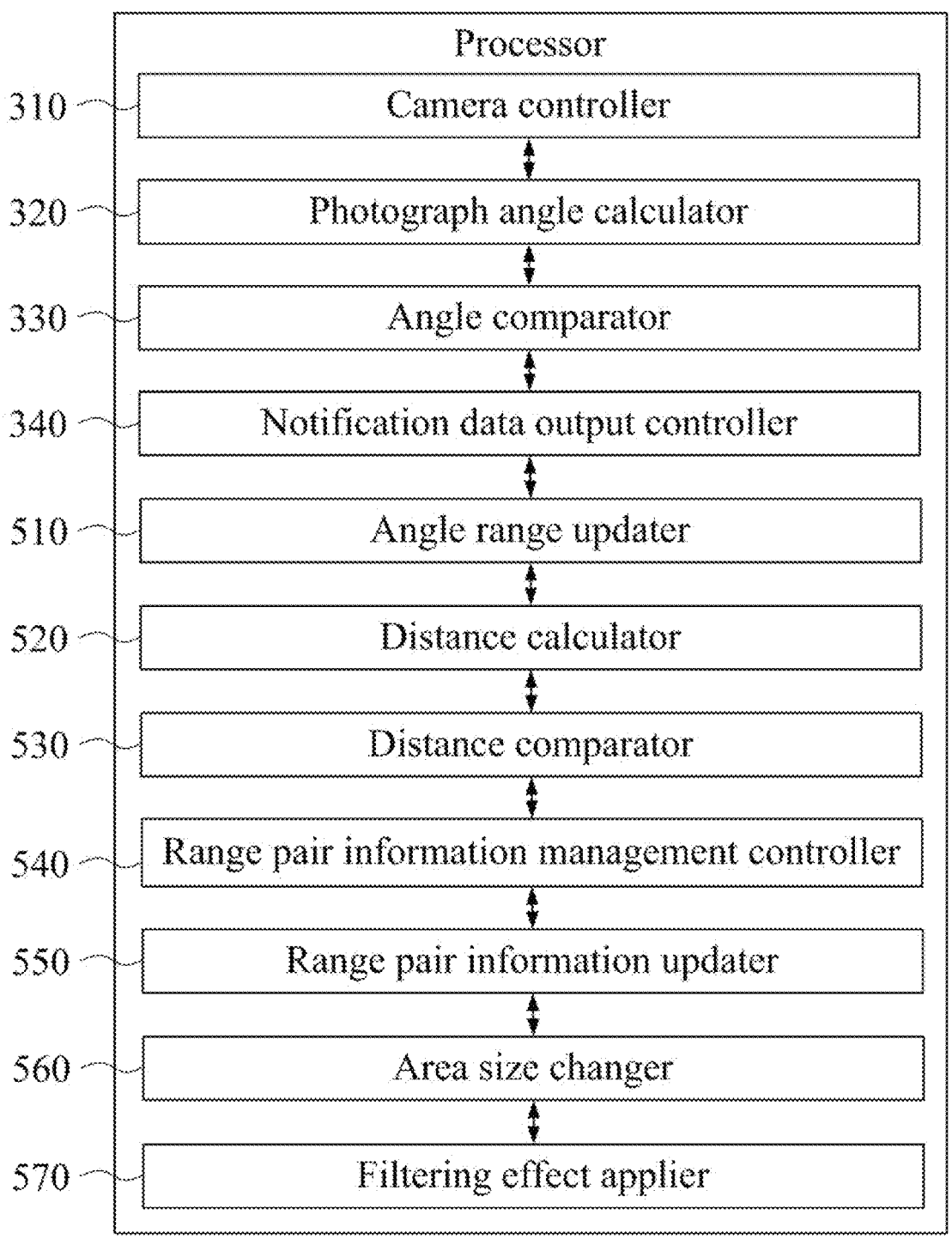
FIG. 5 is a diagram illustrating another example of constituent elements of at least one processor of a server according to at least one example embodiment.
Figure 6:
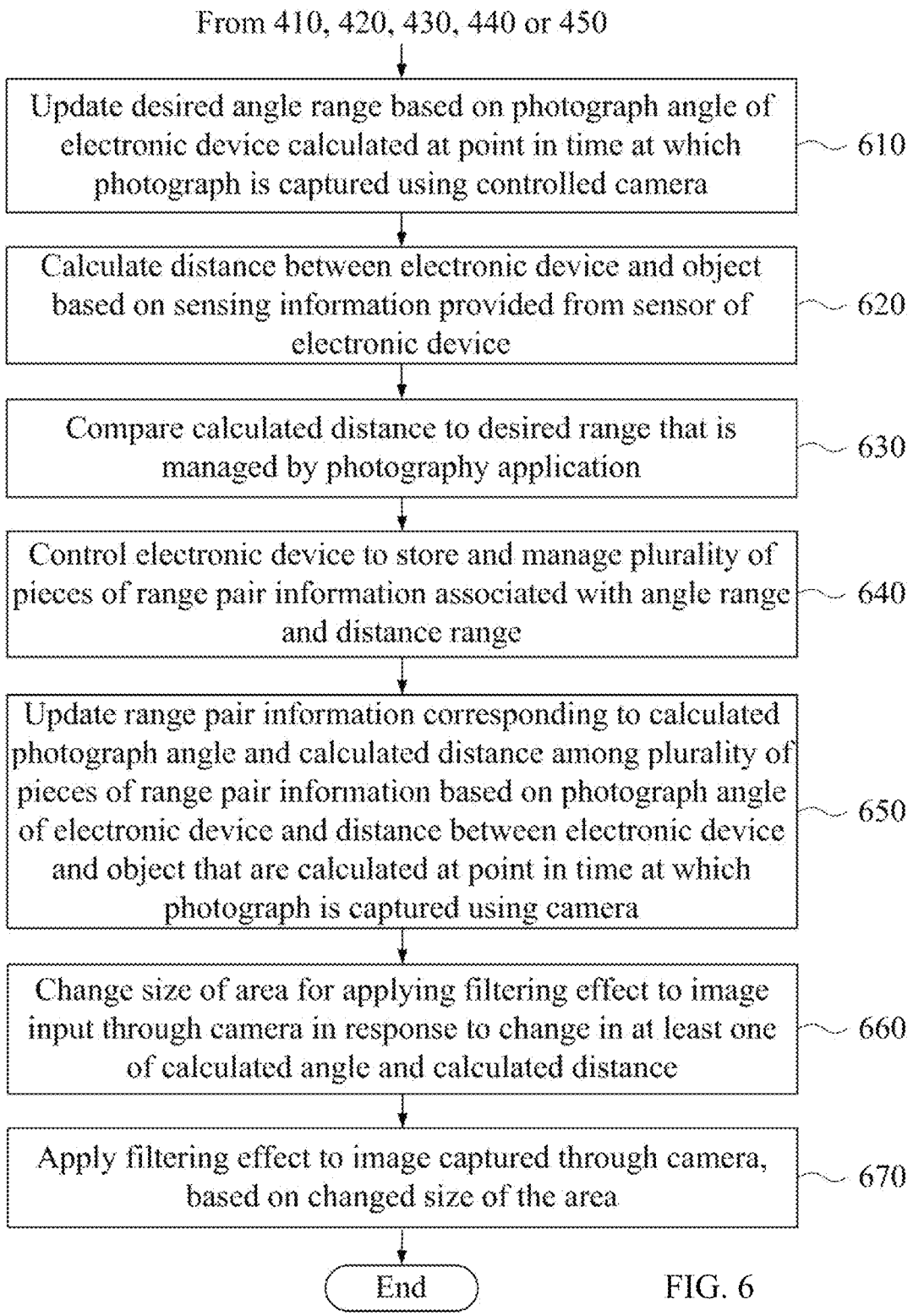
FIG. 6 is a flowchart illustrating another example of an optimal position-of-photographing recommendation method performed by an electronic device according to at least one example embodiment.

FIG. 5 is a diagram illustrating another example of constituent elements includable in a processor of a server according to at least one example embodiment, and FIG. 6 is a flowchart illustrating another example of an optimal position-of-photographing recommendation method performed at an electronic device according to at least one example embodiment.

As described above with FIG. 3, the processor 211 of the electronic device 110 may include the camera controller 310, the photograph angle calculator 320, the angle comparator 330, and the notification data output controller 340 as constituent elements. According to some example embodiments, such as FIG. 5, the processor 211 may selectively further include at least one of an angle range updater 510, a distance calculator 520, a distance comparator 530, a range pair information management controller 540, a range pair information updater 550, an area size changer 560, and/or a filtering effect applier 570. The optimal position-of-photographing recommendation method described with FIG. 3 may selectively further include at least one of operations 610 through 670 in addition to operations 410 through 450. The constituent elements selectively further includable in the processor 212 may be functional representations of the processor 212 configured to perform operations selectively further includable in the optimal position-of-photographing recommendation method among the operations 610 through 670 of FIG. 6.

In operation 610, the angle range updater 510 may update a desired and/or preset angle range based on a photograph capture angle of the electronic device 110 calculated at a point in time at which photographing is performed (e.g., when a user is in the process of taking a photograph and/or video) through the executed and controlled camera. The updated angle range may be used to be compared the photograph capture angle of the electronic device 110 at a subsequent photographing session. Here, in association with the angle range, a plurality of ranges may be stored, managed, and updated. For example, an angle range in which users take selfies and an angle range in which users take a photo of an object, such as food, may be significantly different. Accordingly, the angle range may be set and updated based on angles having a similar value, for example, angles having a difference value less than or equal to a desired range, for example, 5 degrees or less. Angles having greater than or equal to a desired and/or preset value, for example, 15 degrees or more may be used to set and update different angle ranges. Operation 610 may be performed once an image is taken.

In operation 620, the distance calculator 520 may calculate a distance between the electronic device 110 and the object based on sensing information provided from the sensor of the electronic device 110. For example, the electronic device 110 may calculate the distance between the electronic device 110 and the object with a distance sensor using an optical scheme, such as an ultrasonic wave, an infrared (IR) ray, a laser, a time-of-flight depth calculation, etc. As another example, the electronic device 110 may analyze the image input through the camera and may calculate and use a relative distance between the electronic device 110 and the object. Operation 620 may be performed before or after operation 430 of FIG. 4, or may be performed together with operation 430.

In operation 630, the distance comparator 530 may compare the calculated distance to the desired and/or preset range that is managed by the photography application. The distance range may be managed as a range of a distance desired and/or preferred by a user. For example, if the user desires to take a selfie without using separate auxiliary equipment, a distance between the electronic device 110 and the object is highly likely to be constant without being significantly changed. Also, a preferred distance based on a condition, such as a size of a face of the user and the like, may be present. The distance range may be set based on distance values measured at previous photographing of the user (e.g., based on the user's history). Additionally, the distance range may be based on the most commonly used values among a group of users, preferred values set by expert users (e.g., professional photographers), etc. Additionally, the user may select several distance ranges and/or angle ranges for a single composition (e.g., for multiple photos being taken in the same session, or videos, the user may set multiple distance ranges and/or angle ranges for the photos/video being captured for use with each shot). Operation 630 may be performed before or after operation 440 of FIG. 4, or may be performed together with operation 440.

In this case, in operation 450, the notification data output controller 340 may output notification data if the calculated photograph angle is included in the desired and/or preset angle range and if the calculated distance is included in the desired and/or preset distance range.

In operation 640, the range pair information management controller 540 may control the electronic device 110 to store and manage a plurality of pieces of range pair information associated with the angle range and the distance range. As described above, even the same user may have different desired and/or preferred angle and distance values based on the photography situation. For example, the angle and/or distance preferred by the user to take a selfie and the angle and the distance preferred by the user to take a photo of an object, such as food, may be different. Additionally, the angle and/or distance preferred by the user for taking photos may be different from the angle and/or distance preferred for taking videos. Accordingly, the electronic device 110 may store and manage a plurality of pieces of range pair information. Here, the plurality of pieces of range pair information may be managed by the photography application. Operation 640 may be performed once operation 410 of FIG. 4 is initially performed. That is, once the photography application is initially executed, the plurality of pieces of range pair information may be stored and managed. An initial angle range and an initial distance range may be desired and/or preset regardless of previous photographing of the user.

In operation 650, the range pair information updater 550 may update range pair information corresponding to the calculated photograph angle and the calculated distance among the plurality of pieces of range pair information based on the photograph capture angle of the electronic device 110 and the distance between the electronic device 110 and the object that are calculated at a point in time at which photographing is performed through the executed camera (e.g., the current photograph capture angle). Once photographing of the image is performed at the electronic device 110, operation 650 may be performed to apply the photograph angle and the distance preferred by the user. For example, operation 650 may be performed every time photographing is performed by executing the photography application.

In operation 660, the area size changer 560 may change a size of an area for applying a filtering effect to an image input through the camera in response to a change in at least one of the calculated angle and the calculated distance. For example, the area for applying the filtering effect may include at least one of an area for applying an out-of-focus effect, an area for applying a vignetting effect, and an area for applying a mosaic processing effect. In the related art, the user needs to directly adjust a size of a proposed circular area or rectangular area using a multi-touch on a touch screen, etc., or using a button input, etc., in order to control the size of the area. In the example embodiments, the user may adjust the size of the area for applying the filtering effect in an intuitive and simple manner by adjusting the angle of the electronic device 110 and/or the distance between the electronic device 110 and the object.

In operation 670, the filtering effect applier 570 may apply the filtering effect to the image captured through the camera, based on the changed size of the area. That is, in response to progress of photographing, the filtering effect may be automatically applied to the size of the area that is changed based on the photograph angle or the distance.

Figure 7:
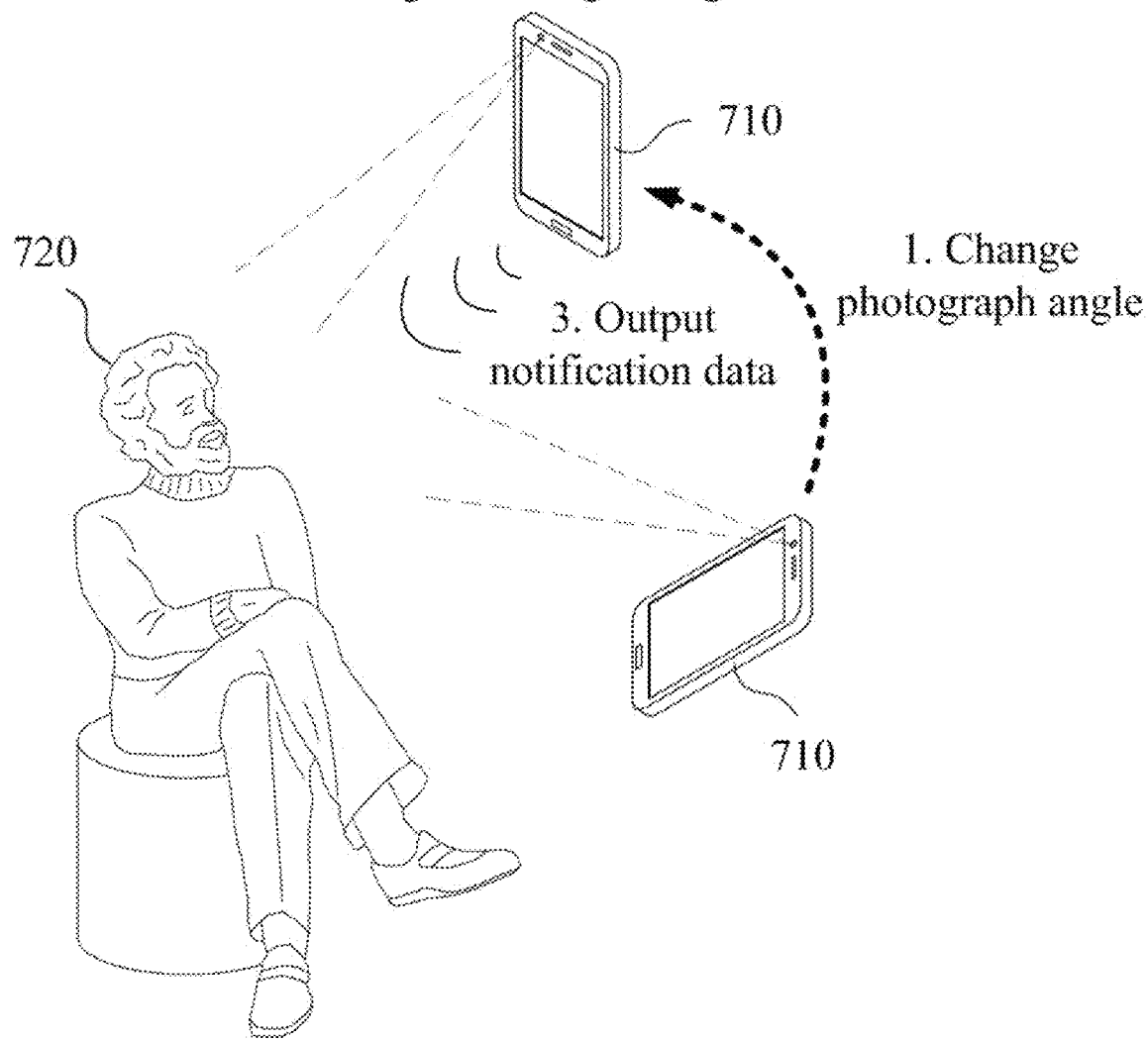
FIG. 7 illustrates an example of outputting notification data based on a photograph angle of an electronic device according to at least one example embodiment.

FIG. 7 illustrates an example of outputting notification data based on a photograph angle of an electronic device according to at least one example embodiment. FIG. 7 illustrates an example in which a photograph capture angle varies in response to a physical movement of an electronic device 710 while photographing an object 720 with the electronic device 710. In this example, the electronic device 710 may compare a calculated photograph angle to an angle range provided from a photography application installed on the electronic device 710. If the calculated photograph angle is included in the provided angle range, the electronic device 710 may output notification data and may notify the user that the calculated photograph angle is a preferred photograph angle of the user. Optionally, the electronic device 710 may simultaneously output the notification data and create an image through automatic capturing without receiving an explicit command from the user.

Figure 8:
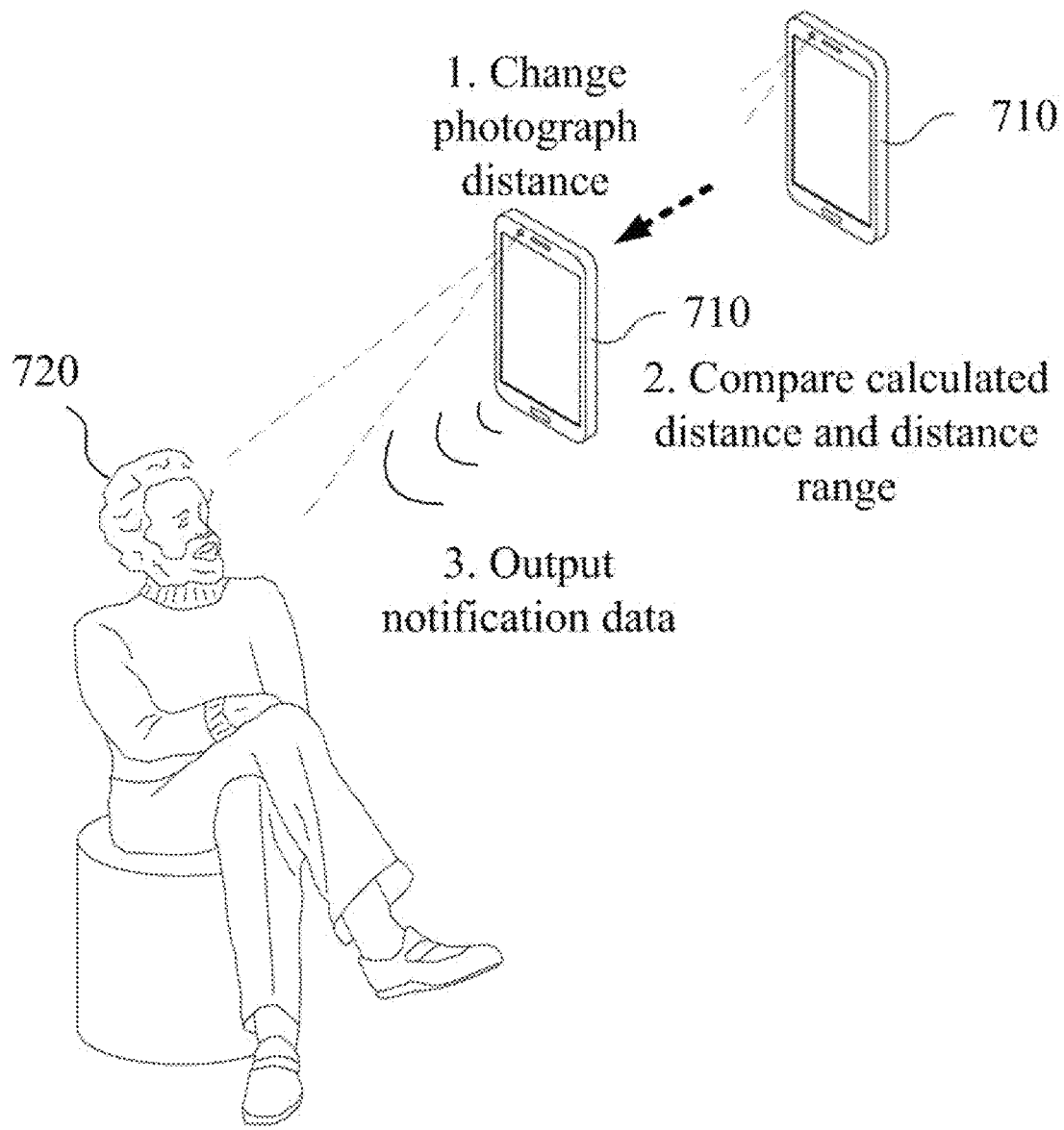
FIG. 8 illustrates an example of outputting notification data based on a distance between an electronic device and an object according to at least one example embodiment.

FIG. 8 illustrates an example of outputting notification data based on a distance between an electronic device and an object according to at least one example embodiment. FIG. 8 illustrates an example in which a distance between the electronic device 710 and the object 720 varies in response to a physical movement of the electronic device while photographing the object 720 with the electronic device 710. Here, the electronic device 710 may compare a calculated distance to a distance range provided from a photography application installed on the electronic device 110. If the calculated distance is included in the provided distance range, the electronic device 710 may output notification data and may inform the user that the calculated distance is at a preferred distance of the user. Even in this case, the electronic device 710 may simultaneously output the notification data and create an image through automatic capturing without receiving an explicit command from the user.

FIGS. 7 and 8 illustrate example embodiments of outputting notification data using the photograph angle and the distance, respectively. Also, the electronic device 710 may be configured to output notification data if a photograph angle calculated based on the photograph angle and/or the distance is included in the angle range and at the same time, the calculated distance is included in the distance range.

Figure 9:
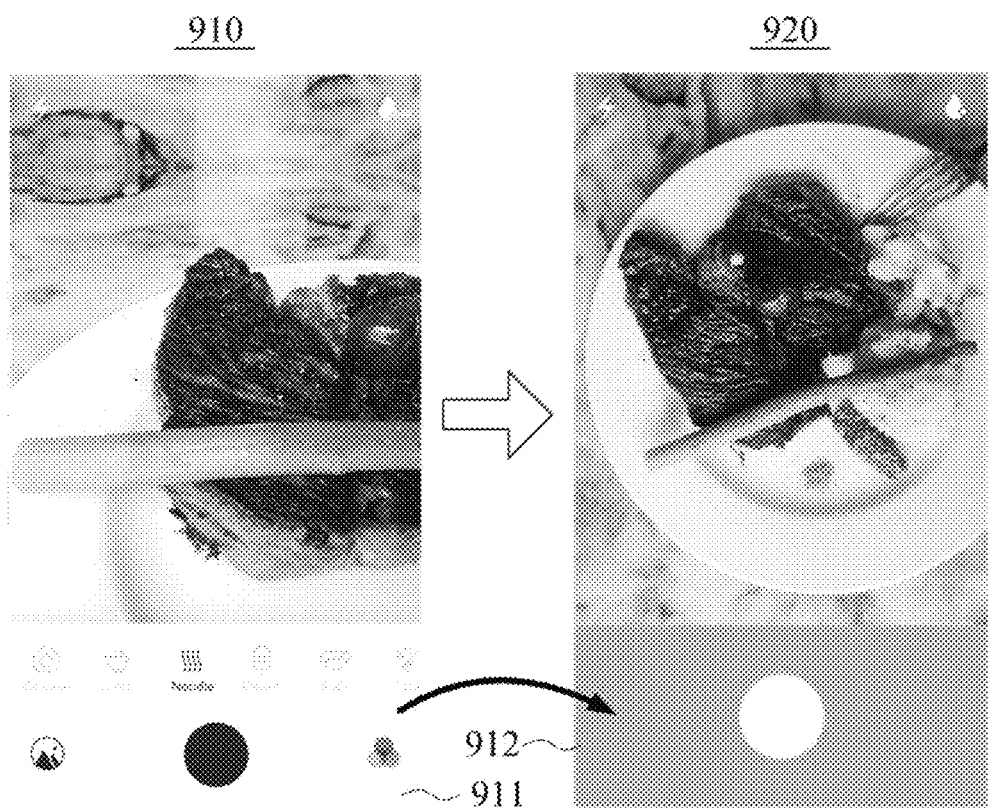
FIG. 9 illustrates an example of outputting notification data based on a change in a photograph angle according to at least one example embodiment.

FIG. 9 illustrates an example of outputting notification data based on a change in a photograph angle according to at least one example embodiment. A first screen 910 of FIG. 9 shows an example of a display of the electronic device 110 on which an image input through a camera is displayed. A second screen 920 of FIG. 9 shows an example of a display of the electronic device 110 on which an image input through a camera is displayed in response to a change in an angle of the electronic device 110. Here, a first user interface 911 on the first screen 910 and a second user interface 912 on the second screen 920 show a change in a color, a shape, a message, and the like. That is, FIG. 9 illustrates an example of changing a user interface from the first user interface 911 to the second user interface 912 and outputting notification data as a visual signal, in response to a change in the angle of the electronic device 110 and the calculated photograph angle of the electronic device 110 being included in the desired and/or preset angle range.

As described above, the notification data may be output based on the distance between the electronic device 110 and the object. Also, the notification data may be output based on the photograph angle and/or the distance.

Figure 10:
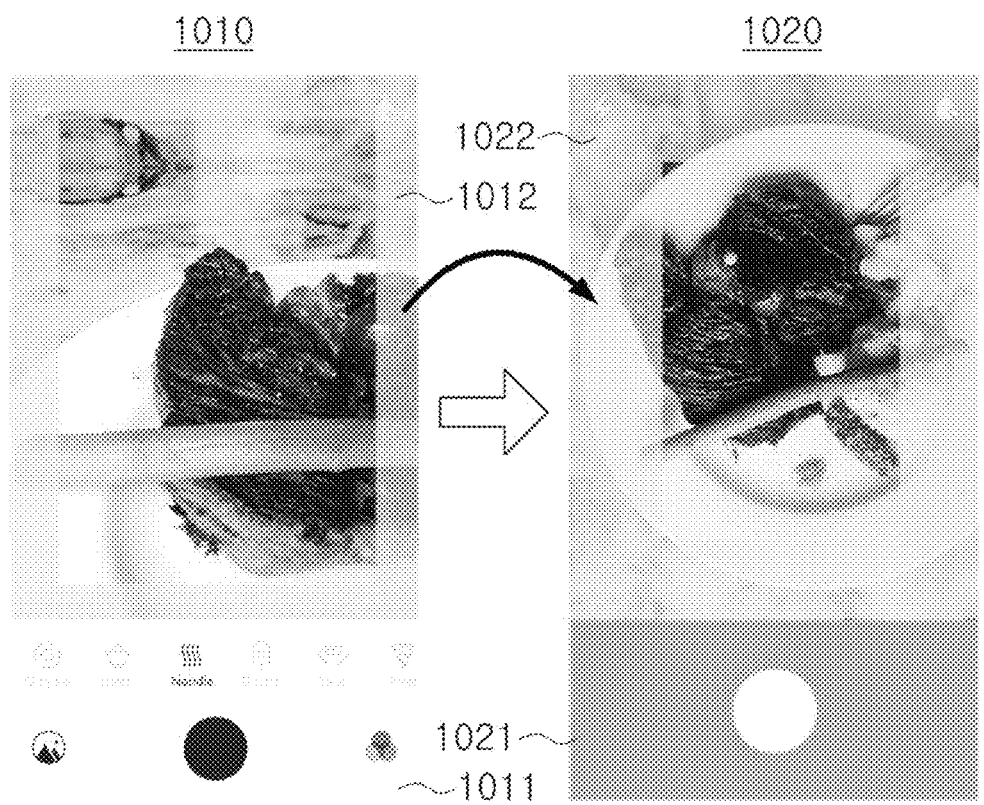
FIG. 10 illustrates an example of changing a size of an area to which a filtering effect is applied based on a change in a photograph angle according to at least one example embodiment.

FIG. 10 illustrates an example of changing a size of an area to which a filtering effect is applied based on a change in a photograph angle according to at least one example embodiment. A third screen 1010 of FIG. 10 shows an example of a display of the electronic device 110 on which an image input through a camera is displayed. Here, a fourth screen 1020 of FIG. 10 shows an example of a display of the electronic device 110 on which an image input a camera is displayed in response to a change in the angle of the electronic device 110. Even in this case, FIG. 10 illustrates an example of changing a user interface from a third user interface 1011 to a fourth user interface 1021 and outputting notification data as a visual signal in response to a change in the angle of the electronic device 110 and the calculated photograph angle of the electronic device 110 being included in the desired and/or preset angle range.

Also, a size of a filtering area, that is, an area for applying a filtering effect may be changed from a first area 1012 to a second area 1022 in response to the change in the photograph angle. Referring to FIG. 10, in response to the change in the photograph angle, the size of the filtering area has increased from the first area 1012 to the second area 1022. As described above, the size of the filtering area may be changed based on the distance between the electronic device 110 and the object. Also, the size of the area for applying the filtering effect may be changed based on all of the photograph angle and the distance.

According to some example embodiments, it is possible to pre-store and manage a range of a desired and/or preferred angle of an electronic device of a user and/or a range of a desired and/or preferred distance of the user between the electronic device and an object, to calculate an angle and a distance of the electronic device when taking a photo, and if the calculated angle and range are included in the stored angle range and/or distance range, to provide a notification to the user. In this manner, it is possible to rectify inconveniences that the user may encounter in terms of needing to refit an angle and a position of the electronic device while verifying a screen of the electronic device every time the user takes a photo and/or video. Also, according to some example embodiments, it is possible to provide a function capable of changing and controlling a size to which a filtering effect is to be applied on a captured image based on a calculated angle and/or distance, so that a user may further conveniently select a filtering area.

The units described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks, DVD and Bluray; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable medium storing computer readable instructions, which when executed by at least one processor, causes the at least one processor to implement an optimal position-of-photographing recommendation method, wherein the optimal position-of-photographing recommendation method comprises:
   controlling a camera included in an electronic device based on a photography application executed on the electronic device;
   calculating a photograph angle of the electronic device based on sensor information provided from at least one sensor of the electronic device;
   comparing the calculated photograph angle to a desired angle range;
   calculating a distance between the electronic device and an object of a photograph to be captured using the camera based on the sensor information;
   comparing the calculated distance to a desired distance range; and outputting notification data in response to the calculated photograph angle being within the desired angle range and the calculated distance being within the desired distance range;
   changing a size of an area for applying a filtering effect to an image input through the camera in response to a change in at least one of the calculated angle and the calculated distance; and
   applying the filtering effect to an image captured through the camera based on the area of the changed size.

2. The non-transitory computer-readable medium of claim 1, wherein the optimal position-of-photographing recommendation method further comprises:
   updating the desired angle range based on a current photograph angle of the electronic device calculated at a point in time at which photographing is performed.

3. The non-transitory computer-readable medium of claim 1, wherein the optimal position-of-photographing recommendation method further comprises:
   storing a plurality of pieces of range pair information associated with an angle range and a distance range; and
   updating range pair information corresponding to the calculated photograph angle and the calculated distance from among the plurality of pieces of range pair information based on a current photograph angle of the electronic device and a current distance between the electronic device and the object, the current photograph angle and the current distance calculated at a point in time at which photographing is performed using the camera.

4. The non-transitory computer-readable medium of claim 1, wherein the area for applying the filtering effect includes at least one of an area for applying an out-of-focus effect, an area for applying a vignetting effect, and an area for applying a mosaic processing effect.

5. The non-transitory computer-readable medium of claim 1, wherein
   the electronic device includes a front camera provided at a front of the electronic device and a rear camera provided at a rear of the electronic device; and
   the desired angle range includes a first angle range associated with photographing using the front camera and a second angle range for determining whether the electronic device is parallel to a ground in association with photographing using the rear camera.

6. The non-transitory computer-readable medium of claim 1, wherein
   the outputting of the notification data comprises,
      outputting a visual signal for changing a display color or a display shape with respect to at least a portion of a display included in the electronic device,
      outputting an auditory signal through a speaker included in the electronic device, or
      outputting a tactile signal by causing shaking using a motor included in the electronic device.

7. An optimal position-of-photographing recommendation method performed by an electronic device, the method comprising:
   executing, using at least one processor, and controlling a camera included in the electronic device;

calculating, using the at least one processor, a photograph angle of the electronic device based on sensor information provided from at least one sensor of the electronic device;

comparing, using the at least one processor, the calculated photograph angle to a desired angle range;

calculating, using the at least one processor, a distance between the electronic device and an object of a photograph to be taken using the camera based on the sensor information provided from the at least one sensor of the electronic device;

comparing, using the at least one processor, the calculated distance to a desired distance range;

outputting, using the at least one processor, notification data in response to the calculated photograph angle being within the desired angle range and the calculated distance being within the desired distance range;

changing, using the at least one processor, a size of an area for applying a filtering effect to an image input through the camera in response to a change in at least one of the calculated angle and the calculated distance; and applying, using the at least one processor, the filtering effect to an image captured through the camera based on the area of the changed size.

8. The method of claim 7, further comprising:
updating, using the at least one processor, the desired angle range based on a photograph angle of the electronic device calculated at a point in time at which photographing is performed using the camera.

9. The method of claim 7, further comprising:
storing, using the at least one processor, a plurality of pieces of range pair information associated with an angle range and a distance range; and
updating, using the at least one processor, range pair information corresponding to the calculated photograph angle and the calculated distance from among the plurality of pieces of range pair information based on a current photograph angle of the electronic device and a current distance between the electronic device and the object, the current photograph angle and the current distance calculated at a point in time at which photographing is performed using the camera.

10. The method of claim 7, wherein
the electronic device includes a front camera provided at a front of the electronic device and a rear camera provided at a rear of the electronic device; and
the desired angle range includes a first angle range associated with photographing using the front camera and a second angle range for determining whether the electronic device is parallel relative to a ground in association with photographing using the rear camera.

11. The method of claim 7, wherein the outputting of the notification data comprises:
outputting a visual signal for changing a display color or a display shape with respect to at least a portion of a display included in the electronic device;
outputting an auditory signal through a speaker included in the electronic device; or
outputting a tactile signal by causing a vibration using a motor included in the electronic device.

12. An optimal position-of-photographing recommending system of an electronic device, the system comprising:
a memory having computer-readable instructions stored thereon; and
at least one processor configured to execute the computer-readable instructions to,
control a camera included in the electronic device;
calculate a photograph angle of the electronic device based on sensor information provided from at least one sensor of the electronic device;
compare the calculated photograph angle to a desired angle range;
calculate a distance between the electronic device and an object of a photograph to be taken using the camera based on the sensor information;
compare the calculated distance to a desired distance range;
output notification data in response to the calculated photograph angle being within the desired angle range and the calculated distance being within the desired distance range;
change a size of an area for applying a filtering effect to an image input through the camera in response to a change in at least one of the calculated angle and the calculated distance; and
apply the filtering effect to an image captured through the camera based on the area of the changed size.

13. The system of claim 12, wherein the at least one processor is further configured to:
update the desired angle range based on a photograph angle of the electronic device calculated at a point in time at which photographing is performed using the camera.

14. The system of claim 12, wherein the at least one processor is further configured to:
store a plurality of pieces of range pair information associated with an angle range and a distance range; and
update range pair information corresponding to the calculated photograph angle and the calculated distance among the plurality of pieces of range pair information based on a current photograph angle of the electronic device and a current distance between the electronic device and the object, the current photograph angle and the current distance calculated at a point in time at which photographing is performed using the camera.

15. An apparatus for executing a photography application, the apparatus comprising:
at least one sensor configured to sense angle information and distance information;
at least one camera;
a display panel; and
at least one processor configured to,
receive inputs associated with a desired angle and a desired distance for an image to be captured;
receive current angle information;
receive current distance information of the at least one camera relative to a target of the at least one camera from the at least one sensor;
determine whether the at least one camera is in a desired position based on the current angle information, the current distance information, the desired angle, and the desired distance;
output a notification based on results of the determination to the display panel;
change a size of an area for applying a filtering effect to an image input through the camera in response to a change in at least one of the calculated angle and the calculated distance; and
apply the filtering effect to an image captured through the camera based on the area of the changed size.

16. The apparatus of claim 15, wherein
the desired angle is a desired angle range;
the desired distance is a desired distance range; and the at least one processor is further configured to determine whether the at least one camera is in a desired position by,
  determining whether the current angle information is within the desired angle range, and
  determining whether the current distance information is within the desired distance range.

17. The apparatus of claim 15, wherein
the at least one sensor includes at least one of a gyroscope, an accelerometer, an ultrasonic wave sensor, an infrared (IR) ray sensor, a laser sensor, and a time-of-flight depth sensor.

18. The apparatus of claim 15, wherein the at least one camera is configured to capture photographs or video.

* * * * *